(12) United States Patent
Isayama

(10) Patent No.: US 9,575,565 B2
(45) Date of Patent: Feb. 21, 2017

(54) ELEMENT SELECTION DEVICE, ELEMENT SELECTION METHOD, AND PROGRAM

(71) Applicant: JUICE DESIGN CO., LTD., Tatsuno, Hyogo (JP)

(72) Inventor: Taro Isayama, Tatsuno (JP)

(73) Assignee: JUICE DESIGN CO., LTD., Hyogo (JP)

( * ) Notice: Subject to any disclaimer, the term of this patent is extended or adjusted under 35 U.S.C. 154(b) by 0 days.

(21) Appl. No.: 14/414,597

(22) PCT Filed: Jul. 11, 2013

(86) PCT No.: PCT/JP2013/068969
§ 371 (c)(1),
(2) Date: Jan. 13, 2015

(87) PCT Pub. No.: WO2014/010670
PCT Pub. Date: Jan. 16, 2014

(65) Prior Publication Data
US 2015/0169073 A1  Jun. 18, 2015

(30) Foreign Application Priority Data

Jul. 13, 2012  (JP) .................................. 2012-157236

(51) Int. Cl.
*G06F 3/048* (2013.01)
*G06F 3/01* (2006.01)
(Continued)

(52) U.S. Cl.
CPC ............. *G06F 3/017* (2013.01); *G06F 3/0425* (2013.01); *G06F 3/0488* (2013.01); *G06F 3/04842* (2013.01); *G06F 3/04847* (2013.01)

(58) Field of Classification Search
CPC ..... G06F 3/017; G06F 3/0425; G06F 3/04842
See application file for complete search history.

(56) References Cited

U.S. PATENT DOCUMENTS

| 5,508,717 A | 4/1996 | Miller |
| 5,594,469 A | 1/1997 | Freeman et al. |

(Continued)

FOREIGN PATENT DOCUMENTS

| EP | 2 040 156 A2 | 3/2009 |
| EP | 2 040 156 A3 | 1/2013 |

(Continued)

OTHER PUBLICATIONS

Takeshi Kurata, Masakatsu Kourogi, Takekazu Kato, Takashi Okuma, and Katsuhiko Sakaue, The HandMouse and Its Applications: Color- and Contour-Based Hand Detection and Tracking, Intelligent Systems Institute Technical Report, 2001, VIS2001-103, vol. 25, No. 85, pp. 47-52, National Institute of Advanced Industrial Science and Technology (AIST), 1-1-1 Umezono, Tsukuba, Ibaraki, 305-8568, Japan (6 pages).

(Continued)

*Primary Examiner* — Omar Abdul-Ali
(74) *Attorney, Agent, or Firm* — Finnegan, Henderson, Farabow, Garrett & Dunner, LLP

(57) ABSTRACT

A selectable element or an element image associated with the element is displayed on a screen of a display unit. A representation of a person whose image is captured with a detection unit, or an indicator that moves in conjunction with a motion of the person is displayed on the screen. The element or the element image is moved so as to be driven out of the representation or the indicator thus displayed. The element is judged as selected based on a movement degree or a post-movement position of the element or the element image thus moved.

10 Claims, 7 Drawing Sheets

(51) Int. Cl.
*G06F 3/0488* (2013.01)
*G06F 3/042* (2006.01)
*G06F 3/0484* (2013.01)

(56) References Cited

U.S. PATENT DOCUMENTS

| | | | |
|---|---|---|---|
| 6,191,773 | B1 | 2/2001 | Maruno et al. |
| 6,771,277 | B2 | 8/2004 | Ohba |
| 8,773,523 | B2 | 7/2014 | Chiu |
| 9,030,487 | B2 * | 5/2015 | Im .................... G06F 3/017 345/619 |
| 2003/0007017 | A1 * | 1/2003 | Laffey ............... G06F 3/04842 715/862 |
| 2007/0139443 | A1 | 6/2007 | Marks et al. |
| 2008/0168364 | A1 * | 7/2008 | Miller ................. G06F 3/016 715/762 |
| 2009/0204622 | A1 * | 8/2009 | Sanders .............. G06Q 20/341 |
| 2010/0169773 | A1 * | 7/2010 | Yoo ................... G06F 3/016 715/702 |
| 2011/0141009 | A1 | 6/2011 | Izumi |
| 2012/0182296 | A1 * | 7/2012 | Han ................... G06F 3/04883 345/419 |
| 2013/0318480 | A1 * | 11/2013 | Nakagawa .......... G06F 3/04815 715/849 |

FOREIGN PATENT DOCUMENTS

| | | |
|---|---|---|
| JP | 5-324181 | 12/1993 |
| JP | 06-259193 | 9/1994 |
| JP | 7-281666 | 10/1995 |
| JP | 8-315154 | 11/1996 |
| JP | 2007-133909 | 5/2007 |
| JP | 2010-140300 | 6/2010 |
| JP | 2-816-456 A1 | 12/2014 |
| WO | WO 2011/084245 | 7/2011 |

OTHER PUBLICATIONS

International Preliminary Report on Patentability and Written Opinion of International Application No. PCT/JP2013/068969 issued by the International Searching Authority on Sep. 10, 2013 (4 pages).
Extended European Search Report dated Mar. 14, 2016, issued by the European Patent Office in corresponding European application No. 13817055.0 (11 pages).
Anonymous: "JavaScript 'Click Me' prank for beginners—htmOwl Web Development, Chicago," retrieved on Mar. 3, 2016, from the Internet at URL: http://www.htmowl.com/blog/javascript-click-me-prank-beginners/ (4 pages).

* cited by examiner

ELEMENT SELECTION DEVICE, ELEMENT SELECTION METHOD, AND PROGRAM

TECHNICAL FIELD

The present invention relates to an element selection apparatus, an element selection method and a program.

BACKGROUND ART

Heretofore, there has been developed a method of allowing a user, when manipulating an apparatus in a non-contact state, to select an element on a display screen by using his/her hand or finger instead of using a remote controller.

For example, an input device described in Patent Document 1 is disclosed as follows. Specifically, in order for a person to input information by a hand or finger operation without touching an apparatus, the input device captures images of a hand or finger of the input person pointed to a display, and calculates a direction in which the hand or finger is pointed toward the display based on the captured images. Then, the input device displays a cursor on the display to present a position on the display corresponding to the calculated direction. When detecting a click operation of the hand or finger, the input device selects, as information submitted by the input person, information in a portion where the cursor is positioned.

CONVENTIONAL TECHNIQUE DOCUMENT

Patent Document

Patent Document 1: JP-A-5-324181

SUMMARY OF THE INVENTION

Problem to be Solved by the Invention

The conventional input device, however, has various problems as follows. Conventionally, the input device requires the computational calculation of the pointing direction of the hand or finger and a complicated operation for judgment of a click operation. Furthermore, when a user tries to perform a decision operation such as a click operation after positioning a hand or finger, the user tends to perform a wrong operation due to a displacement of the positioned hand or finger.

The present invention has been made in view of the foregoing problems, and has an objective to provide an element selection apparatus, an element selection method and a program that are capable of improving ease of manipulation in selecting an element on a display in a non-contact state.

According to one aspect of the present invention, an element selection apparatus includes a unit that recognizes one or more motions of one or more hands or fingers, a unit that displays one or more first images which move in conjunction with the recognized one or more motions of the one or more hands or fingers, a unit that displays one or more second images associated with one or more selectable elements, and performs movement control to cause the second image to interact with and avoid the first image when the first image comes into contact with the second image; and a unit that judges that a selectable element associated with the second image is selected when an interactive relation between the first image and the second image meets a predetermined condition.

According to another aspect of the present invention, an element selection apparatus includes at least a display unit, a detection unit and a control unit. The control unit includes a representation display control unit that displays, on the screen, one or more representations of a person detected with the detection unit, or one or more indicators that move in conjunction with one or more motions of the person, an element display control unit that displays one or more selectable elements, or one or more element images associated with the one or more elements on the screen of the display unit, and causes the one or more elements or element images to move to keep out of the one or more representations or indicators displayed by the representation display control unit, and a selection judgment unit that judges that an element is selected based on a movement degree or a post-movement position of the element or the element image moved by the element display control unit, or based on the one or more motions of the person.

In the element selection apparatus according to still another aspect of the present invention, the element display control unit preferentially performs control to cause the one or more elements or element images to move so as to be driven out of the one or more representations or indicators, and otherwise moves the one or more elements or element images to a predetermined position or in a predetermined direction.

In the element selection apparatus according to still another aspect of the present invention, the representation display control unit displays, on the screen, one or more representations of one or both arms, one or both hands, or one or more fingers of a person whose image is captured with the detection unit, or one or more indicators that move in conjunction with one or more motions of the one or both arms, the one or both hands, or the one or more fingers of the person.

In the element selection apparatus according to still another aspect of the present invention, the element display control unit causes the one or more elements or the element images to move so as to be driven out by an outline or a center line of the representation or the indicator.

In the element selection apparatus according to still another aspect of the present invention, the movement degree is a moving distance or a time period elapsed after movement from an initial position.

According to still another aspect of the present invention, an element selection method includes the steps of; recognizing one or more motions of one or more hands or fingers; displaying one or more first images that move in conjunction with the recognized one or more motions of the one or more hands or fingers; displaying one or more second images associated with one or more selectable elements, and performing movement control to cause the second image to interact with and avoid the first image when the first image comes into contact with the second image; and judging that a selectable element associated with the second image is selected when an interactive relation between the first image and the second image meets a predetermined condition.

According to still another aspect of the present invention, an element selection method is implemented by a computer including at least a display unit, a detection unit and a control unit. The method executed by the control unit includes a representation display controlling step of displaying, on the screen, one or more representations of a person detected with the detection unit, or one or more indicators that move in conjunction with one or more motions of the person, an element display controlling step of displaying one or more selectable elements, or one or more element images associated with the one or more elements on the screen of the display unit, and causing the one or more elements or element images to move to keep out of the one or more representations or indicators displayed in the representation display controlling step, and a selection judging step of judging that an element is selected based on a movement degree or a post-movement position of the element or the element image moved in the element display controlling step, or based on the one or more motions of the person.

According to still another aspect of the present invention, a program causes a computer to execute the steps of: recognizing one or more motions of one or more hands or fingers; displaying one or more first images that move in conjunction with the recognized one or more motions of the one or more hands or fingers; displaying one or more second images associated with one or more selectable elements, and performing movement control to cause the second image to interact with and avoid the first image when the first image comes into contact with the second image; and judging that a selectable element associated with the second image is selected when an interactive relation between the first image and the second image meets a predetermined condition.

According to still another aspect of the present invention, a program is executed by a computer including at least a display unit, a detection unit and a control unit. The program causes the control unit to execute a representation display controlling step of displaying, on the screen, one or more representations of a person detected with the detection unit, or one or more indicators that move in conjunction with one or more motions of the person, an element display controlling step of displaying one or more selectable elements, or one or more element images associated with the one or more elements on the screen of the display unit, and causing the one or more elements or element images to move to keep out of the one or more representations or indicators displayed in the representation display controlling step, and a selection judging step of judging that an element is selected based on a movement degree or a post-movement position of the element or the element image moved in the element display controlling step, or based on the one or more motion of the person.

According to still another aspect of the present invention, computer-readable storage medium have stored therein the aforementioned program so as to be readable by a computer.

Effect of the Invention

According to the present invention, it is possible to provide an element selection apparatus, an element selection method, a program, and a storage medium that are capable of improving ease of manipulation in selecting an element on a display in a non-contact state.

BRIEF DESCRIPTION OF DRAWINGS

FIG. 3 is a view depicting one example of an external view of a display device 114 including a display screen displayed under the control of an element display control unit 102a.

MODES FOR CARRYING OUT THE INVENTION

Figure 1:
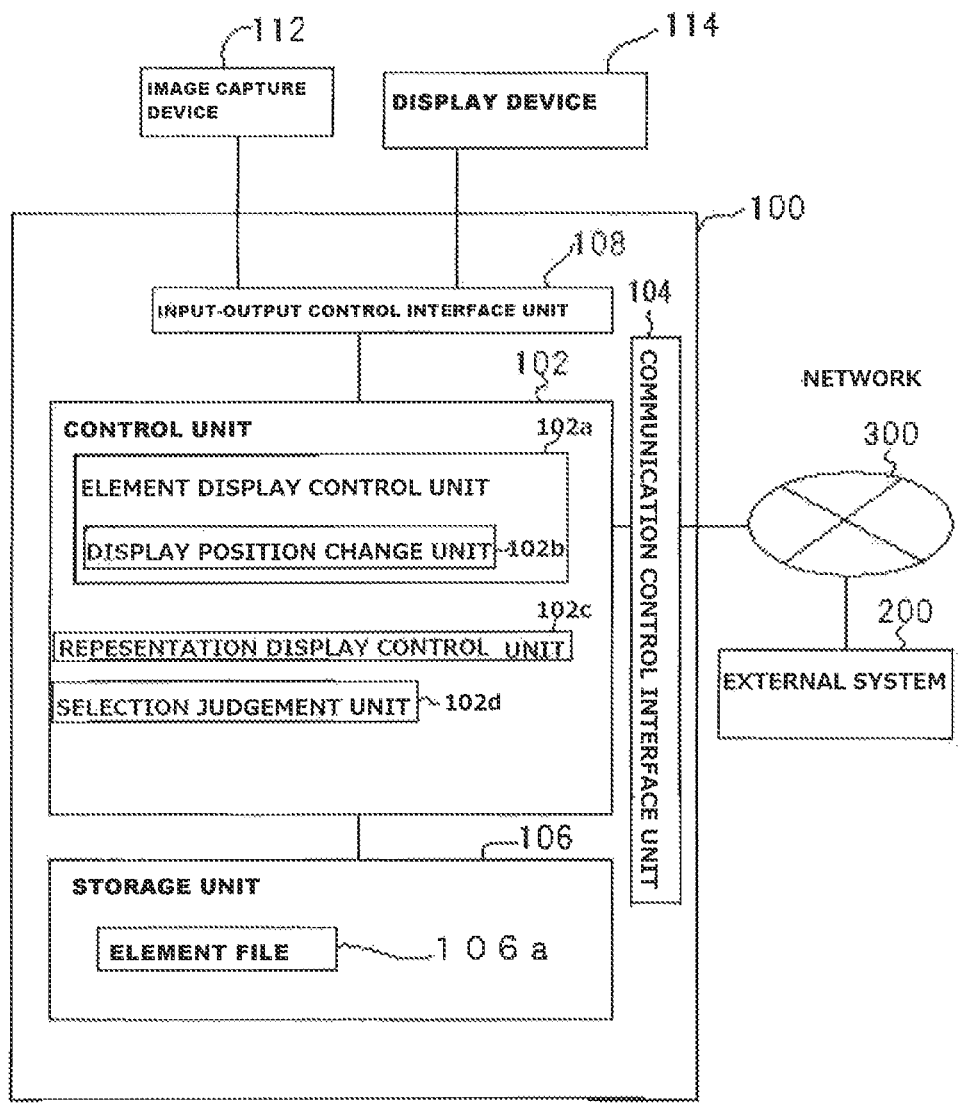
FIG. 1 is a block diagram depicting one example of a configuration of an element selection apparatus 100 to which the present embodiment is applied.

Hereinafter, an element selection apparatus, an element selection method, a program and a storage medium according to embodiments of the present invention are described in details based on the drawings. It should be noted that the invention should not be limited by the embodiments.

General Description of Embodiment

Hereinafter, a general description of embodiments according to the present invention is described, and then a configuration, processing and the like of the present embodiment are described in details. It should be noted that the general description below described should not be interpreted as limiting the configuration or processing of the present embodiment described later.

Nowadays, development on smart televisions and the like has been in progress. For example, the input device described in Patent Document 1 is disclosed such that the input device captures an image of a hand or finger which an input person points toward the display without using a remote controller, displays a cursor on the display to show a position on the display corresponding to the direction in which the hand or finger is pointed at the display, and selects information in a portion where the cursor is positioned as information submitted by the input person when detecting a click operation of the hand or finger.

Here, a manipulation of selecting an element on a screen without using a remote controller as in a conventional technique (such as Patent Document 1) has nature decisively different from that of a method using a mouse or a tough pad in the following points.

Specifically, heretofore, when operating a mouse or touch pad by using a graphic user interface (GUI) presented on a screen, a user firstly (1) makes positioning to place a cursor on an element on the screen; and then (2) selects the element on the screen by performing a decision manipulation such as a click after confirming the position.

When using a device such as a mouse or touch pad, a dynamic and static frictional forces act. Therefore, it is less likely that the user will perform a wrong operation due to a displacement during a period from (1) the positioning to (2) the decision manipulation.

If this manipulation method including (1) and (2) is directly applied to a remote-controller-less television or the like, a user needs to (1) perform a positioning manipulation by moving a cursor on a screen with his/her finger or hand held in the air, and (2) perform a decision manipulation by moving the finger or hand in a predetermined action, as described in Patent Document 1.

Since no friction acts on the finger or hand held in the air, the following problems are considered to arise: the finger or hand tends to move freely and be displaced during the period from (1) the positioning manipulation to (2) the decision manipulation and therefore to perform a wrong manipulation; and the displacement may highly possibly occur particularly in an attempt to take the action for (2) the decision manipulation.

Hence, the inventor of the present application has conducted earnest studies in view of the foregoing problems, and has completed the present invention. An embodiment of the present invention has the following features.

Specifically, in the present embodiment, a selectable element or an element image associated with the element is displayed on a screen of a display unit. For example, the present embodiment may display, as the element image, a point or the like which is a representative point representing the selectable element.

Then, in the present embodiment, a representation of a person whose image is captured with a detection unit, or an indicator that moves in conjunction with a motion of the person is displayed on the screen, and the element or the element image is moved so as to be driven out of the representation or the indicator thus displayed.

In addition, in the present embodiment, the element is judged as selected when the element or the element image falls under a predetermined condition (such as a predetermined movement degree or a predetermined post-movement position). Here, the present embodiment is not limited to the case where the element is judged as selected based on the movement condition, but also the element may be judged as selected based on an action. For example, in the present embodiment, when a predetermined action is taken such as an action where an opened hand is closed, the element or the element image may be judged as falling under the predetermined condition to select the element.

As such, the present embodiment enables the element selection and decision as similar to the manipulations (1) and (2) without requiring (1) the positioning of a mouse pointer, a cursor or the like in the conventional technique. Specifically, the user can confirm the selection of an element as similar to the manipulation (1), by using his/her own representation or indicator presented on the screen and intuitively performing a manipulation such as grabbing, holding, catching, pressing, nipping or hitting of the element or the element image on the picture. Then, after the confirmation, the user may control the condition (such as the movement degree or the post-movement position) by intuitively performing a manipulation such as 'grabbing and pulling', 'holding for a certain time', 'catching and pulling down', 'pushing up', 'nipping and pulling', or 'throwing by hitting', and thereby can submit a decision of the element selection as similar to the manipulation (2). When the element is judged as selected not based on the movement condition but based on an action, the user may control the condition, after the confirmation, by intuitively taking an action manipulation such as 'grabbing and squeezing', 'gripping while holding', 'catching and then removing the hand with acceleration', 'pushing up and throwing away', 'nipping and then making the two fingers come together', or 'touching and then snapping', and thus can submit the decision of the element selection as similar to the manipulation (2).

Accordingly, it is possible to reduce the uncertainty in the positioning due to a conventional manipulation using mid-air hand or finger movements, and therefore to contribute to significant improvement in the ease of manipulation.

Here is the end of the general description of the embodiments of the invention.

[Configuration of Element Selection Apparatus 100]

To begin with, description is provided for a configuration of an element selection apparatus 100 as one example of a computer according to an embodiment. FIG. 1 is a block diagram depicting an example of a configuration of the element selection apparatus 100 to which the present embodiment is applied, and conceptually depicts only parts of the configuration involved in the present embodiment.

As depicted in FIG. 1, the element selection apparatus 100 mainly includes a control unit 102, a communication control interface unit 104, an input-output control interlace unit 108, and a storage unit 106. The control unit 102 is a CPU or the like that centrally performs overall control of the element selection apparatus 100. The communication control interface unit 104 is connected to a communication device (not illustrated) such as a router connected to a communication line or the like. The input-output control interface unit 108 is connected to an image capture device 112, a display device 114 and the like. The storage unit 106 stores various kinds of databases and tables. These units are communicatively connected to each other via certain communication channels.

The various kinds of databases and tables (element file 106a and the like) stored in the storage unit 106 are storage units, such as a fixed disk device, that store various kinds of programs, tables, files, databases, web pages and the like to be used in various kinds of processing.

Among the constituent elements of the storage unit 106, the element file 106a is an element data storage unit that stores data to be displayed as display elements on a display screen. For example, the element file 106a may store data to be displayed as objects such as icons, letters, symbols, figures, and three-dimensional objects. In addition, the element file 106a may be associated with a program and the like so that a predetermined process (display of a link destination, display of a menu, power-on/off, channel change, mute, timer recording, or the like) is performed in response to a selection manipulation such as a click. The data format of the data to be displayed as the display elements is not limited to a format of image data, letter data or the like, but may be any data format. Moreover, the element file 106a may be updated to reflect a result of movement (including rotation and scale up/down) by later-described processing of the control unit 102. For example, an object A (or its element image) in the element file 106a is moved by display control to fall under a certain movement condition, the element file 106a stores data related to the object A with 0 (for example, a function-off mode) changed to 1 (for example, a function-on mode) under the control of the control unit 102. In one example, the element file 106a may store data for displaying web pages in a markup language such as html. In the data, selectable elements are, for example, link indicating parts in the web pages. In general html data, such a link indicating part is a text part, an image part or the like put between a start tag and an end tag, and this part is highlighted (for example, underlined) as a selectable (clickable) area on the display screen. In an example of the present embodiment, in place of a selectable area on a usual GUI, an element image (such as a point) is allocated to each selectable element. For example, if a selectable area on the usual GUI is a rectangular area from the lower left coordinates (X1, Y1) to the upper right coordinates (X2, Y2) on the display screen, a later-described element display control unit 102a may set an initial position of the point to the center point ((X1+X2)/2, (Y1+Y2)/2) of the rectangular area, or to the upper right point (X2, Y2) of the rectangular area.

In addition, in FIG. 1, the input-output control interface unit 108 controls the image capture device 112 and the display device 114. For example, the display device 114 is a display unit such as a liquid crystal panel or an organic EL panel. Here, the element selection apparatus 100 may include a sound output unit such as a speaker, which is not illustrated, and the input-output control interface unit 108 may control the sound output unit. Although the following embodiment is mainly described that the display device 114 is a monitor (including a home television or the like), the present invention is not limited to this embodiment.

Moreover, the image capture device 112 is an image capture unit such as a camera. For example, the image capture device 112 may be a detection unit such as a CMOS sensor or a CCD sensor. Here, the image capture device 112 may be a photo detection unit that detects light of a certain frequency (e.g., infrared light). Use of the infrared camera as the image capture device 112 allows easy determination of the area of a person (heat-producing area) in an image, and thus enables, for example, a hand area to be determined from a temperature distribution of the person or the like. In other examples, an ultrasonic or electromagnetic-wave distance measurement device (such as a depth detection unit), a proximity sensor or the like may be used as the image capture device 112. For example, a combination of a depth detection unit and an image capture unit may be used to make determination on an image of an object (e.g., a person) located at a predetermined distance (depth). Alternatively, a known sensor, region determination technique, and control unit such as Kinect™ may be used as the image capture device 112. The image capture device 112 is not limited to sensing bio-information (skin color, temperature, infrared, and the like) of a person. But, the image capture device 112 may function as a position detection unit configured to detect a motion of the person in place of the image capture unit. For example, the device 112 as the position detection unit may detect the position of a light source or the like held by a hand of a user or attached to an arm or any other part of the user.

The present embodiments are not limited to using the image capture device 112, but any detection unit may be used to recognize a motion of a person, particularly, a motion of a hand and/or a finger of the person. In this case, the detection unit may detect a motion of a hand by use of any known non-contact manipulation technique or any known image recognition technique. For example, the detection unit may recognize an up-down or left-right motion of a mid-air hand or a mid-air hand gesture. A gesture may be derived from a user's position or motion in the physical space and may include any user motion, dynamic or static, such as running, moving a finger, or a static pose. According to an example embodiment, a capture device, such as a camera like the image capture device 112, may capture user image data including data that represents the user's gesture(s). A computer environment may be used to recognize and analyze the gestures made by the user in the user's three-dimensional physical space such that the user's gestures may be interpreted to control aspects of a system or application space. The computer environment may display user feedback by mapping the user's gesture(s) to an avatar or the like on a screen (see WO2011/084245). In one example, Leap Motion Controller (manufactured by Leap Motion, Inc) may be used as a known unit that recognizes hand or finger motions. In another example, a combination of Kinect for Windows™ (manufactured by Microsoft Corporation) and Windows™ OS may be used as a known unit capable of remote control. Here, hand and/or finger skeleton information can be obtained by the Kinect sensor of Xbox One manufactured by Microsoft Corporation. Individual motions of all the fingers can be tracked by the Leap Motion sensor. In such sensors, the hand and/or finger motion is analyzed by a control unit incorporated in the sensor, or by a computer control unit connected to the sensor. Functional-conceptually, such control units may be considered as a detection unit in the present embodiment, or may be considered as a control unit (for example, a selection judgment unit 102d) in the present embodiment, or may be any or a combination of these units.

Here, description is provided for a positional relationship between the detection unit and the display unit, and their relationship with the display of a first image (the representation of a hand or finger of a person or the like). For the purpose of illustration, a horizontal axis and a vertical axis of a plane of the display screen are referred to as an X axis and a Y axis, respectively, and a depth direction with respect to the display screen is referred to as a Z axis. In general, a user is located away from the display screen in the Z axis direction. The detection unit may be installed on a display screen side and directed toward the person. In another example, the detection unit may be installed behind the person and directed toward the display screen. In still another example, the detection unit may be installed below an arm lifted by the person (on a ground side) and directed to the hand of the person (with the sensor facing a ceiling). As described above, the detection unit is not limited to an image capture unit that captures a two-dimensional image of a person, but may three-dimensionally detect the person. More specifically, the detection unit may capture the three-dimensional image of a person, and a later-described representation display control unit 102c may convert the three-dimensional image captured by the detection unit into a two-dimensional image and display the two-dimensional image as the first image on the display device 114. In this case, the representation display control unit 102c may obtain a two-dimensional image in a XY plane, or may not. Namely, the unit 102c does not have to take the two-dimensional image along the XY plane. For example, there is a case where two fingers (e.g., a thumb and a forefinger) of a person appear to touch each other when viewed in the Z axis direction from the display screen side, but the two fingers are three-dimensionally apart from each other. In this way, the appearance (the shading) in the Z axis direction is sometimes different from a user's feeling of the fingers. Therefore, the representation display control unit 102c may not necessarily display a XY-planar projection of the figure. For example, the representation display control unit 102c may obtain a two-dimensional image of the person's hand by cutting the three-dimensional image thereof in a direction away from each other of the two fingers. Instead, the representation display control unit 102c may display the XY-planar projection, while the selection judgment unit 102d may judge if the two fingers are touching or apart from each other based on the three-dimensional image sensed by the detection unit so as to agree with the user's feeling.

In addition, in FIG. 1, the control unit 102 includes an internal memory that stores control programs such as an OS (Operating System), programs that specify various kinds of processing procedures, and required data. The control unit 102 performs information processing to implement various kinds of processing by using these programs and the like. In terms of functional concept, the control unit 102 includes the element display control unit 102a, a display position change unit 102b, the representation display control unit 102c and the selection judgment unit 102d.

Among these units, the element display control unit 102a is an element display control unit that performs control to display an element (or an element image (also referred to as a "point" hereinbelow) associated with the element) as a display element on the display device 114 based on the element data stored in the element file 102a. In other words, the element display control unit 102a displays a second image (such as selectable element or element image). Incidentally, the element display control unit 102a may initially hide such points and display the points when a certain condition is met (when the representation or the indicator is superimposed on a certain display element on the display screen, for example). Here, in the present embodiment, the element display control unit 102a includes the display position change unit 102b as depicted in FIG. 1. The element data does not always have to be read by controlling the element file 106a, but instead may be acquired by download from a storage unit (such as an element database) of an external system 200 via a network 300 or may be acquired through reception of broadcast airwaves or the like via a receiver device, which is not illustrated in the drawings. The initial display position of the point associated with each element may be set to any position. In order that the correspondence between the point and the element can be recognized by a user, a red dot or the like may be displayed as the point at a position such as the center of the displayed element (the center of a graphic representation as the element), or the right upper position of the displayed element (the upper right corner of a character string as the element).

In addition, the display position change unit 102b is a movement control unit that changes the display position of the second image (such as selectable display element or element image) such that the second image can be driven out of the first image (such as the representation or the indicator) displayed by the representation display control unit 102c. For example, suppose a case where the first image (such as representation or indicator) approaches the second image (display element, point or the like), and then the outline of the first image comes into contact with the outline of the second image. In this case, under the control of the display position change unit 102b, the second image may move in conjunction with the first image while being kept in contact with the outline of the first image, unless the first image turns around and moves away from the second image. In one example of the present embodiments, the display position change unit 102b performs control such that the representation or indicator displayed on the display screen by the representation display control unit 102c may move the display element or point to a position out of the representation or indicator. Here, the display position change unit 102b may limit a direction, range and the like where the display element or point can be moved. In addition, the display position change unit 102b may preferentially perform control to cause the display element or point to move so as to be driven out of the representation or indicator, and may otherwise move the display element or point to a predetermined position or in a predetermined direction. Specifically, the display position change unit 102b may perform the control, as a preferential condition, to exclude the display element or point from the representation or indicator, and may move, as a subordinated condition, the display element or point to the predetermined position or in the predetermined direction. For example, when the display element (or point) is out of contact with the representation (or indicator), the display position change unit 102b may return the display element (or point) to the initial display position. In another example, when the display element (or point) is not located near the representation (or indicator), the display position change unit 102b may move the display element (or point) in a downward direction on the screen so that the user can feel as if the gravity were acting on the display element (or point). For convenience of explanation, the following description is provided in some part by explaining a display element or point as a representative of the display element and point, and a representation or indicator as a representative of the representation and indicator. However, the description should not be interpreted by being limited to only one of the display element and the point or only one of the representation and the indicator. For example, a part mentioned below as a display element may be read and applied as a point, and a part mentioned below as a representation can be read and applied as an indicator. On the other way round, a part mentioned below as a point may be read and applied as a display element, and a part mentioned below as an indicator may be read and applied as a representation.

Here, there are various modes of how the display element moves to keep out of a representation. For example, the display position change unit 102b may cause a representative point (center point, barycenter or the like) of a display element to move so as to be driven out by the outline of the representation. Instead, the display position change unit 102b may cause the outline of the display element to move so as to be driven out by the outline of the representation. Alternatively, the display element change unit 102b may cause the outline of the display element to move so as to be driven out by a representative line (center line or the like) of the representation or a representative point (barycenter, center point or the like) of the representation. Moreover, the control for such driving-out movement is not limited to a mode where the display element and the representation are kept in a contact state, but the display element change unit 102b may cause the display element to move so as to recede from the representation while keeping the display element in a non-contact state as if S poles of magnets repulse each other.

In addition, in an exceptional example where a display element moves to keep out of a representation, the display element may be moved so as to traverse the representation. For instance, when the representative point of the display element is not located near an inflection point of the outline of the representation, the display position change unit 102b may cause the display element to move to traverse through the representation. More specifically, when movement control is performed as if a tensile force were applied between the display element and the initial position, the display element, unless located between fingers or at a base of fingers, may be moved so as to traverse the representation of a hand and be returned to the initial position when the tensile force reaches a predetermined level or above. Alternatively, when the representative point of the display element falls into a local minimum of the outline line of the representation, the display position change unit 102b may perform control to allow the display element to traverse the representation (such as a hand area) unless the representative point of the display element is located at a tangent point or an inflection point of the curve of the outline of the representation.

The representation display control unit 102c is a representation display control unit that displays a representation of a person whose image is captured with the image capture device 112 (or an indicator that moves in conjunction with the motion of the person) as a first image on the screen of the display device 114. Here, the representation display control unit 102c may display a mirror image of a user as if the screen were a mirror when viewed from the user. For example, by the representation display control unit 102c, a representation of a person whose image is captured with the image capture device 112 directed toward the person from the display screen of the display device 114 may be displayed as a left-right reversed representation on the display screen. Instead, if the image capture device 112 is installed to face the display screen of the display device 114 from behind the person, there is no need to reverse the representation in the left-right direction. Such mirror image display of the representation by the representation display control unit 102c makes it easier for the user (person) to manipulate his/her own representation in such a way as to change the position of his/her own reflection in a mirror. In other words, the user is enabled to control the representation (or the indicator that moves in conjunction with the motion of the person) on the display screen in such a way as to move his/her own silhouette. Thus, such embodiment contributes to the improvement in ease of manipulation. Incidentally, the representation display control unit 102c may display only the outline line of the representation of the person, or may display the outline line of the indicator. Specifically, the area of the representation of the person is left unfilled, so that the inside of the outline can be made transparent and a display element inside the outline can be displayed. This produces an effect of offering superior visibility. In the way described above, the representation or indicator displayed on the display device 114 may be displayed as a mirror image.

Here, the representation display control unit 102c may display a representation(s) of an arm(s), a hand(s) or a finger(s) of a person whose image is captured with the image capture device 112 on the display screen of the display device 112. In this case, the representation display control unit 102c may distinguish the area(s) of the arm(s), the hand(s), the finger(s) or the like from the captured image of the person by using the infrared region, skin color or the like, and cut out and display only the distinguished area(s) of the arm(s), the hand(s), the finger(s) or the like. Instead, the representation display control unit 102c may determine the area(s) of the arm(s), the hand(s), the finger(s) or the like by using any known area determination method.

Moreover, the representation display control unit 102c may display on the screen one or more indicator(s) (such as a polygon(s) or a picture(s) of a tool or the like) that moves in conjunction with the motion(s) of the arm(s), the hand(s) or the finger(s) of the person. Here, the representation display control unit 102c may display the indicator(s) corresponding to the position(s) of the area(s) of the arm(s), the hand(s), the finger(s) or the like determined as described above, or instead may detect the position(s) of the arm(s), the hand(s), or the finger(s) in another method and display the indicator(s) corresponding to the position(s) thus detected. In an example of the latter case, the representation display control unit 102c may detect the position of a light source attached to an arm by way of the image capture device 114, and may display the indicator such that the indicator moves in conjunction with the detected position. Alternatively, the representation display control unit 102c may detect the position of a light source held by a hand of the user and display the indicator such that the indicator moves in conjunction with the detected position. Here, the representation display control unit 102c may allow a user to select a kind of indicator (one of kinds of graphic tools to be displayed as the indicator, including: pictures illustrating tools such as scissors, an awl, a stapler and a hammer; polygons; and the like) by using an input unit not illustrated, or using the representation of the hand. This allows the user to use the selected easy-to-operate graphic tool to make element selection, even if it is difficult for the user to operate with his/her own representation.

Next, the selection judgment unit 102d is a selection judgment unit that judges that an element is selected based on a condition (such as a movement condition of a movement degree or a post-movement position, or an action) of the second image (the element or point) moved by the display position change unit 102b of the element display control unit 102a. For example, when the display element (or point) reaches a predetermined position or stays at a predetermined position, the selection judgment unit 102d may judge that the display element is selected. In another example, the movement degree may be a moving distance or a time period that passes after a movement from the initial position. For instance, when the display element (or point) is moved by a predetermined distance, the selection judgment unit 102d may judge that the element is selected. Alternatively, when a predetermined time period has passed after the display element (or point) was moved from the initial display position, the selection judgment unit 102d may judge that the element is selected. More specifically, when the display element (or point) is controlled to be returned to the initial position as the subordinated condition under the movement control of the display position change unit 102b, the selection judgment unit 102d may judge that the element is selected if the predetermined time period has already passed after the display element (or point) was moved from the initial display position. Here, when a point is an object to be moved, the selection judgment unit 102d judges that the element associated with the point is selected.

In another example, when a first image touches and moves a second image (such as element or point) and then takes a predetermined action on the second image (for example, an action such as closing the opened hand, or bringing two fingers in a non-contact state into contact with each other), the selection judgment unit 102d may judge that the display element is selected. For instance, based on a change in the three-dimensional image of a hand of a person sensed by the detection unit, the selection judgment unit 102d may judge whether the palm of the hand is opened or closed or judge whether the two fingers of the thumb and the forefinger are away from or touch each other. Then, when judging that the predetermined action is done, the selection judgment unit 102d may judge that the selectable element associated with the second image interacting with the first image is selected.

Here, such selection judgment is equivalent to an event such, for example, as a click in a mouse manipulation, an ENTER key press in a keyboard manipulation or a target touch manipulation in a touch panel manipulation. In one example, when the selectable element associated with the second image is a link destination, the selection judgment unit 102d performs control to transition the current display to the display of the link destination if judging that the element is selected. Besides, the selection judgment unit 102d may judge an action of the user by using a known action recognition unit, a known motion recognition function or the like, which is used to recognize the motion of a person sensed by the aforementioned Kinect sensor or Leap Motion sensor.

Next, in FIG. 1, the communication control interface unit 104 is a device that controls communications between element selection apparatus 100 and the network 300 (or a communication device such as a router) and controls communications between the element selection apparatus 100 and the receiver device not illustrated. In other words, the communication control interface unit 104 has a function to communicate data with other terminals or stations via communication lines (indifferent to wired or wireless lines). In addition, here, the receiver device is a reception unit that receives radio waves and the like from broadcast stations or the like, and is, for example, an antenna or the like.

To put it differently, the element selection apparatus 100 may be communicatively connected via the network 300 to the external system 200 that provides an external database for the image data, external programs such as a program according to the present invention, and the like, or may be communicatively connected via the receiver device to the broadcast stations or the like that transmit the image data and the like. Further, the element selection apparatus 100 may also be communicatively connected to the network 300 via a communication device such as a router and a wired or wireless communication line such as a dedicated line.

Here, in FIG. 1, the network 300 has a function to connect the element selection apparatus 100 and the external system 200 to each other, and is for example the Internet or the like.

Then, in FIG. 1, the external system 200 is mutually connected to the element selection apparatus 100 via the network 300 and has a function to provide the user with the external database for the image data and web sites that allow execution of the external programs such as the program.

Here, the external system 200 may be configured as a WEB server, an ASP server or the like, and may have a hardware configuration including a commercially-available general information processing apparatus such as a workstation or personal computer, and its auxiliary equipment. Then, functions of the external system 200 are implemented by a CPU, a disk device, a memory device, an input device, an output device, a communication control device and the like in the hardware configuration of the external system 200, control programs of these devices, and the like.

[Display Information Processing]

Figure 2:
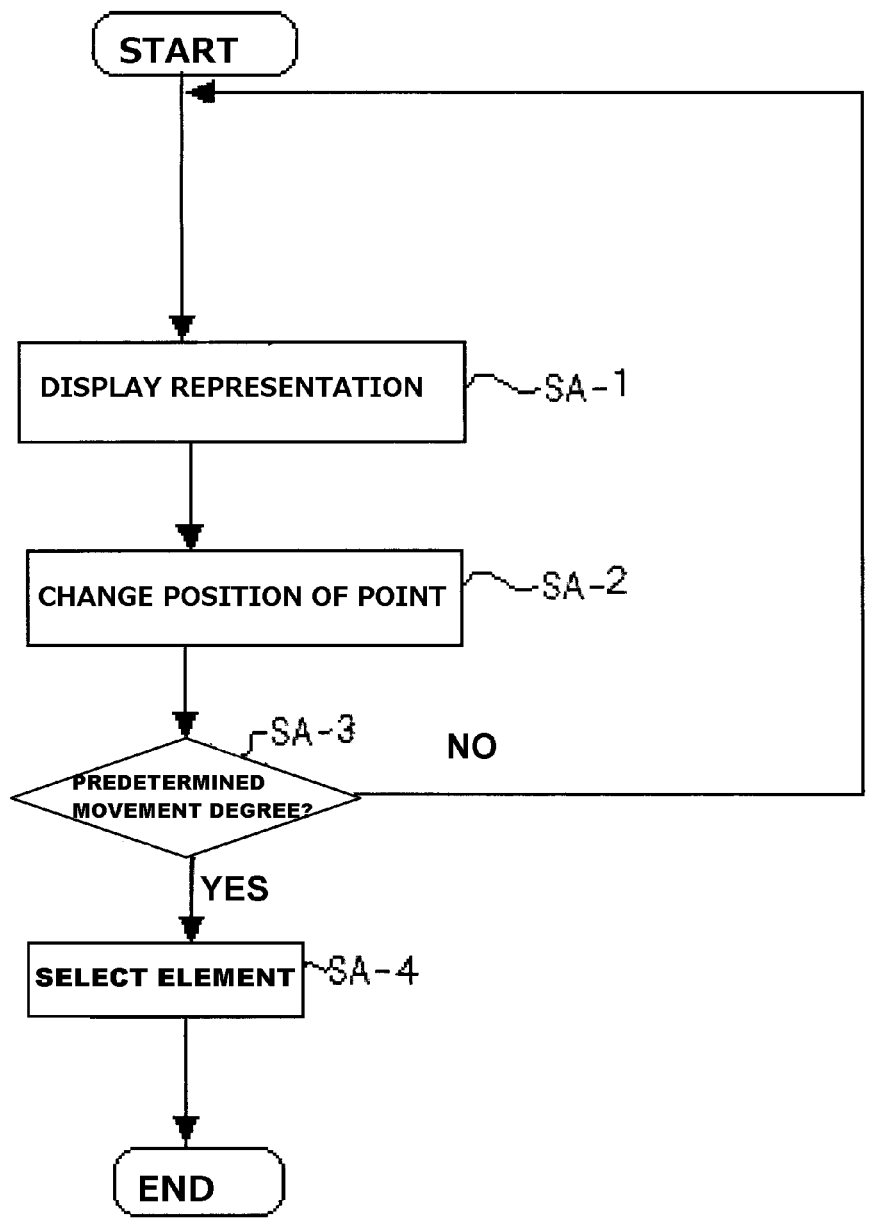
FIG. 2 is a flowchart depicting one example of display information processing of the element selection apparatus 100 in the present embodiment.

Next, one example of display information processing of the element selection apparatus 100 configured as described above in the present embodiment is described below in detail with reference to FIG. 2. FIG. 2 is a flowchart depicting one example of the display information processing of the element selection apparatus 100 in the present embodiment.

Figure 3:
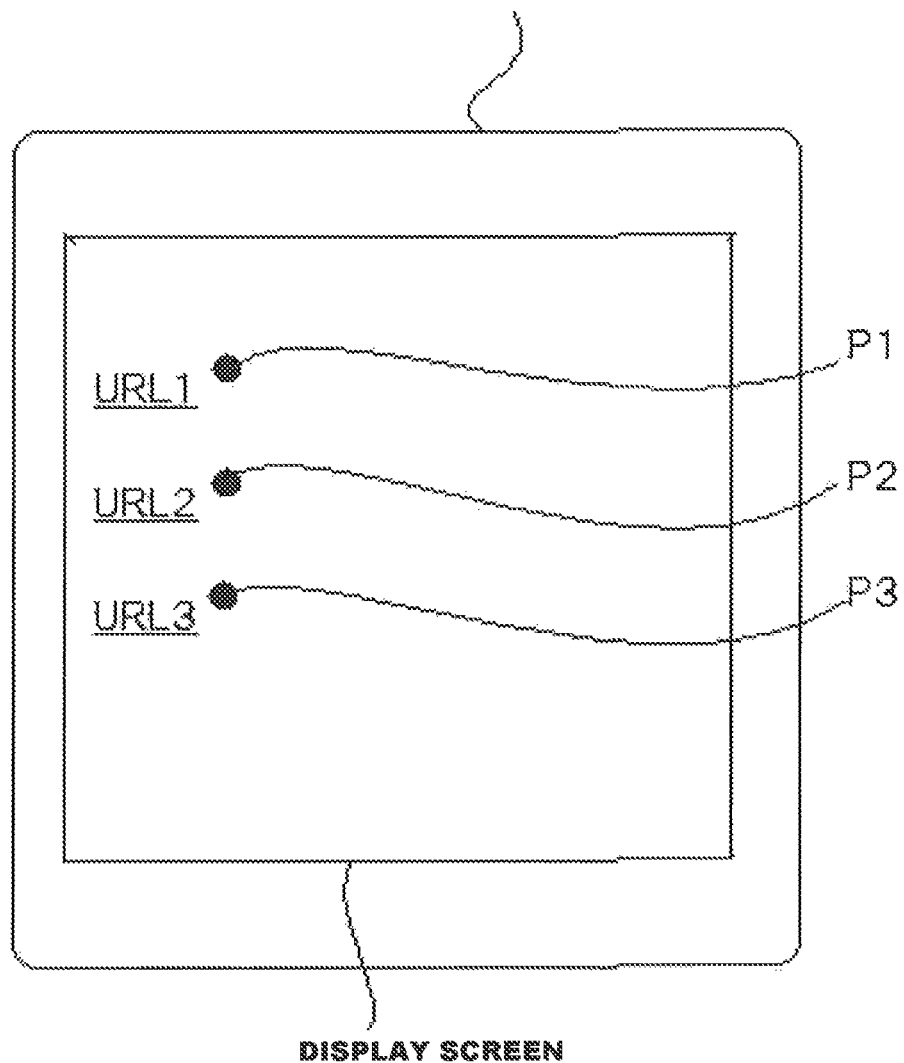

Note that the following processing is started on the premise that a certain type of display elements are displayed on the display device 114 under the control of the element display control unit 102a. In this connection, FIG. 3 is a diagram depicting an example of an external view of the display device 114 having the display screen displayed under the control of the element display control unit 102a. As depicted in FIG. 3, the element selection apparatus 100 includes the display device 114 having the display screen depicted as a rectangular area. In this example, as depicted in FIG. 3, the element display control unit 102a displays solid black circle points above and to the left of the linkable letter string, as images in association with elements selectable to be link indications. Specifically, a point P1 is associated with the link of a URL1: "www.aaa.bbb.ccc/", a point P2 is associated with the link of a URL2: "www.ddd.eee.fff/", and a point P3 is associated with the link of a URL3: "www.ggg.hhh.iii/". Then, programming is made such that selection of any of these elements will result in display of the associated link destination as similar to general web sites. In this example embodiment of the display information processing, the point positions are controlled such that the points can move. However, in another embodiment, display elements (link letter strings, icons or the like) may be controlled such that the display elements themselves can move without displaying any points.

Figure 4:
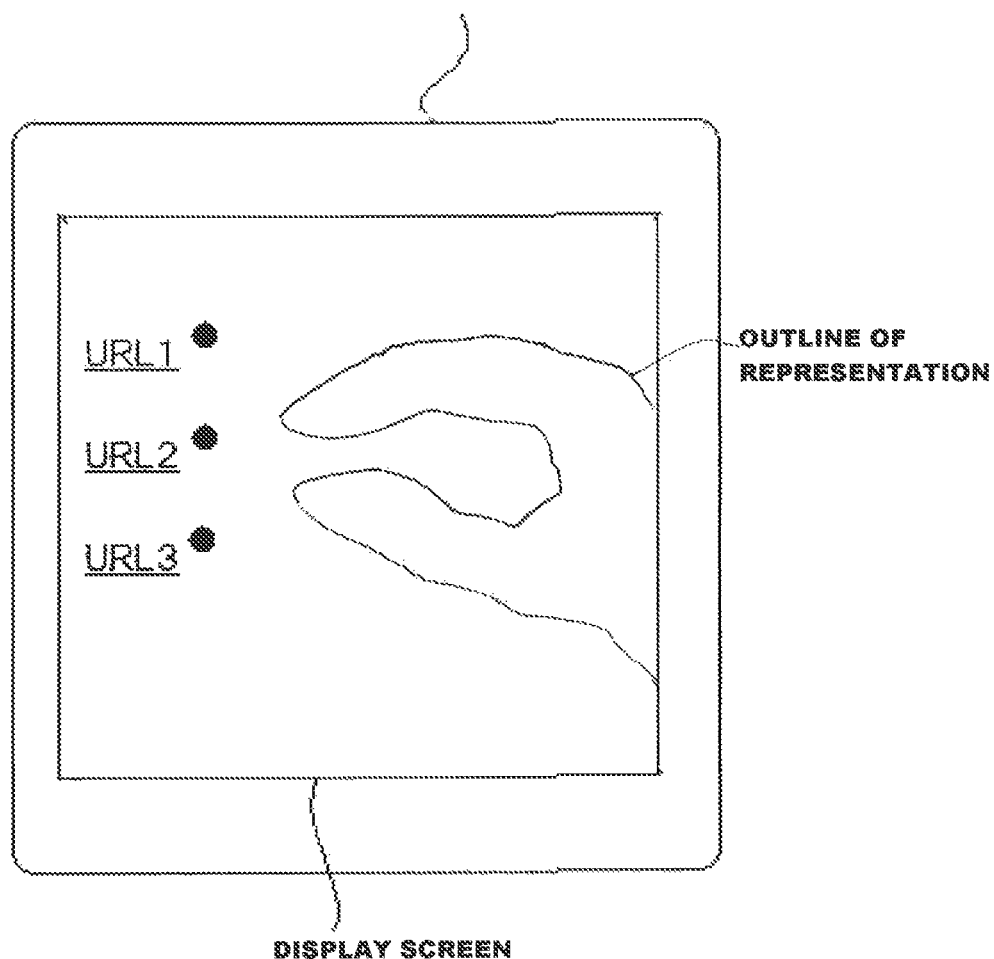
FIG. 4 is a view depicting one example of a display screen in which a representation of a user is displayed in a superimposed manner on the initial screen of FIG. 3.

As depicted in FIG. 2, firstly, the representation display control unit 102c displays a representation of a person, whose image is captured with the image capture device 112, on the screen of the display device 114 (step SA-1). In this step, the representation display control unit 102c may display the representation on the display screen of the display device 114 as if the user viewed his/her own mirror image. FIG. 4 is a diagram depicting one example of the display screen where the representation of the user is displayed in a superimposed manner on the initial screen of FIG. 3.

As depicted in FIG. 4, from the entire image of a person captured with the image capture device 112, the representation display control unit 102c may display only the representation(s) of an arm(s), a hand(s) or finger(s) on the display screen of the display device 112. For example, the representation display control unit 102c may distinguish the area(s) of the arm(s), the hand(s), the finger(s) or the like from the captured image of the person by a known area determination method using an infrared region, skin color or the like, and then cut out and display only the area of the arm(s), the hand(s), the finger(s) or the like. Alternatively, the representation display control unit 102c may display only the outline line of the representation of the person and make the part inside the outline line of the representation transparent. Thus, the area of the representation of the person is left unfilled and the display elements inside the outline are presented. This way of display contributes to the improvements in ease of manipulation and visibility.

Figure 5:
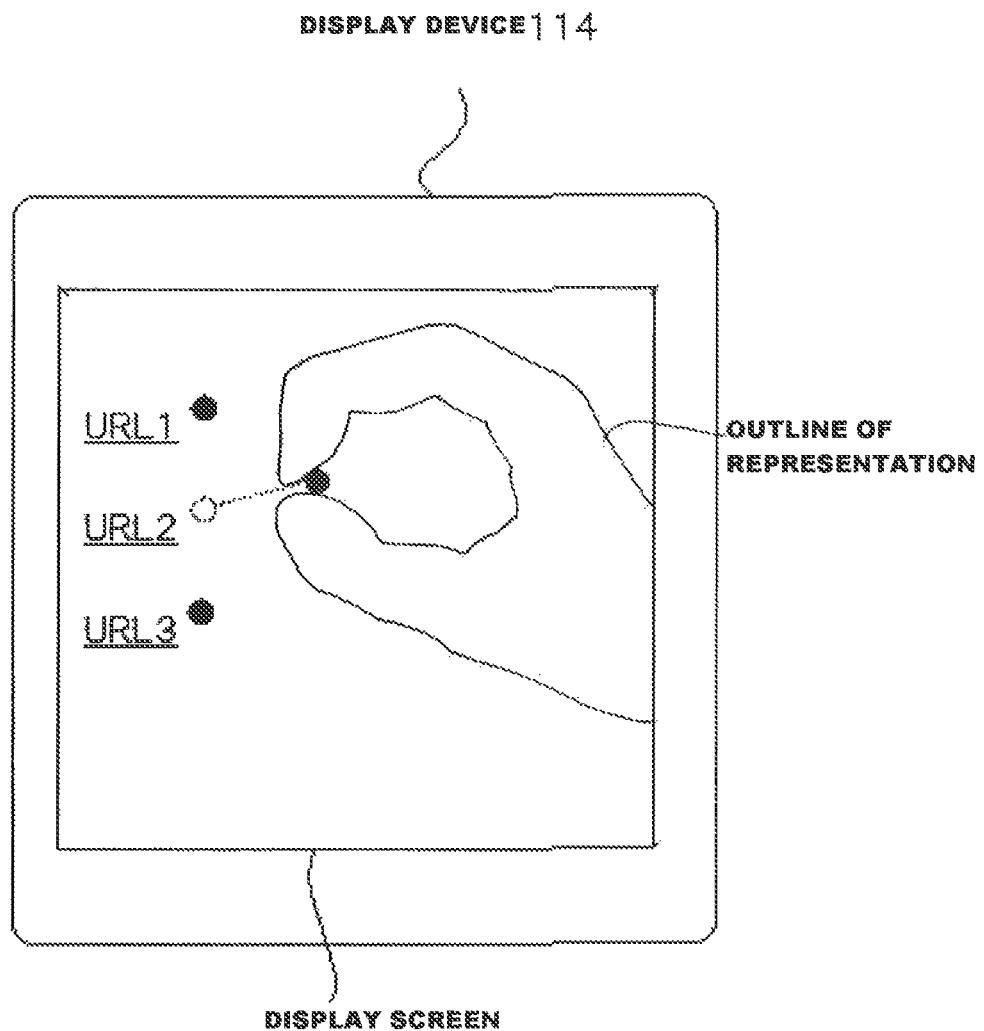
FIG. 5 is a display screen example depicting one example of a pointer P2 whose display position is moved by a display position change unit 102b.

Here, the description is returned to FIG. 2, again. The display position change unit 102b changes the display position of the point associated with a selectable element so that the point is driven out of the representation(s) displayed by the representation display control unit 102c (step SA-2). FIG. 5 is a display screen example depicting one example of the point P2 whose display position is moved by the display position change unit 102b, in FIG. 5, a broken-line circle indicates the initial display position of the point P2, and a broken straight line indicates a distance d between the initial display position and the post-movement display position. The broken lines may be displayed on the display screen, or may not be displayed.

As depicted in FIG. 5, in order that the point can move to keep out of the representation, the display position change unit 102b may cause the point to move so as to be driven out by the outline of the representation. Although the depicted example is just one movement control example where the outline of the point is driven out by the outline of the representation, the movement control is not limited to this example. The display element change unit 102b may perform movement control such that the outline(s) of the point(s) is driven out by a representative line(s) (such as a center line) of the representation(s), or may cause the display element(s) to move out of contact with the representation(s) so as to recede from the representation(s).

Here, the display position change unit 102b may preferentially perform movement control such that the display element or point is driven out of the representation or indicator, and may also move the display element or point to the predetermined position or in the predetermined direction. For example, the display position change unit 102b may move the point back to the pre-movement initial display position if the point is out of contact with the representation.

The description is again returned to FIG. 2. Based on the movement degree of the point moved by the display position change unit 102b of the element display control unit 102a, the selection judgment unit 102*d* judges whether the element associated with the point is selected or not (step SA-3). For example, the selection judgment unit 102*d* may judge that the element associated with the point P2 is selected (e.g., display of the link destination of URL2 is selected) when the point 2 moves by a predetermined movement degree (e.g., when the movement degree reaches a predetermined threshold or above) such as cases where: the point P2 reaches a predetermined position; the moving distance d from the initial position reaches a predetermined threshold or above; and a certain time period passes after the start of movement from the initial position.

If the selection judgment unit 102*d* judges that the movement does not reach the predetermined movement degree (step SA-3, No), the element selection apparatus 100 performs control to return the processing to step SA-1, and to iterate the foregoing processing steps. Specifically, the representation display control unit 102*c* updates the display of the representation (step SA-1), subsequently the display position change unit 102*b* performs the movement control of the display position (step SA-2), and then the selection judgment unit 102*d* again judges the movement degree (step SA-3).

If judging that the movement reaches the predetermined movement degree (step SA-3, Yes), the selection judgment unit 102*d* judges that the element associated with the point is selected (step SA-4). Then, the control unit 102 of the element selection apparatus 100 performs the selection processing. For instance, in the example in FIG. 5, if the distance d between the initial position and the post-movement display position of the point P2 reaches a predetermined threshold or above, the selection judgment unit 102*d* may judge that the element (the link of URL2) associated with the point P2 is selected, and the element selection apparatus 100 may provide display of the link destination of URL2.

Figure 6:
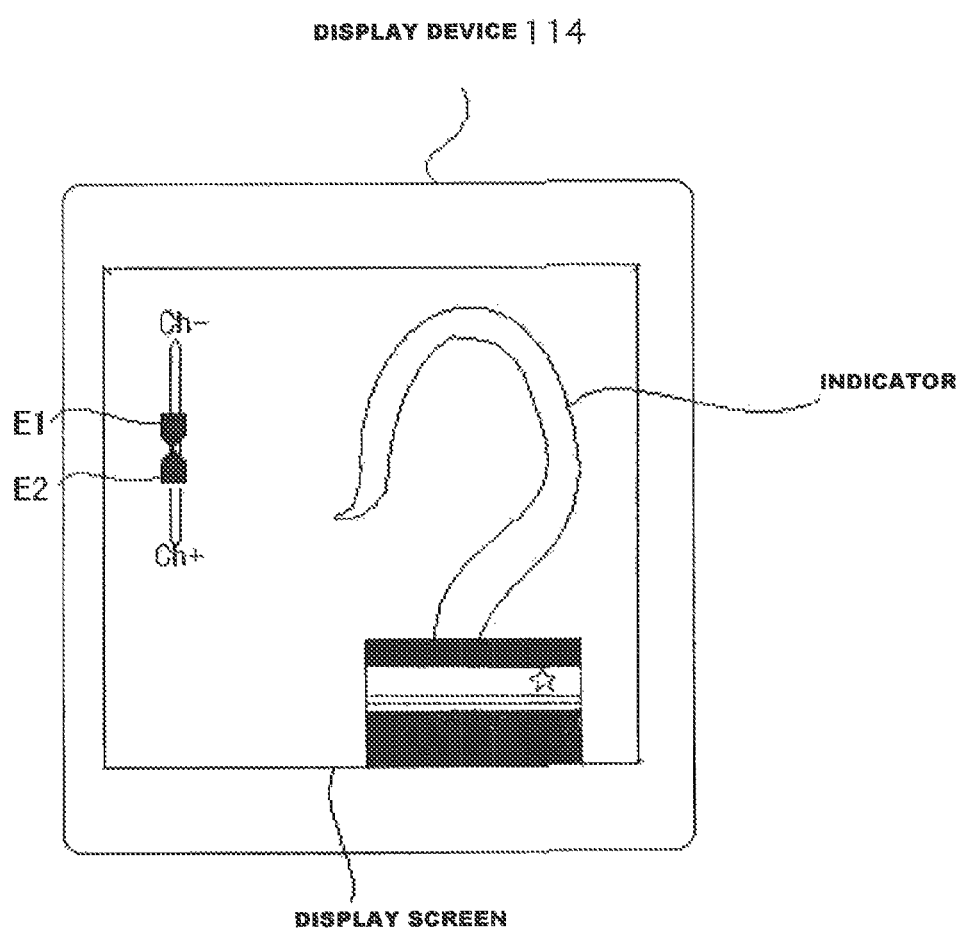
FIG. 6 is a view depicting one example of a display screen where display elements E1 and E2 and an indicator shaped like a hand of Captain Hook are displayed.

The foregoing description is provided as one example of the processing of the element selection apparatus 100 in the present embodiment. Although the foregoing example is provided based on the movement control example where the point associated with the element moves to keep out of the representation, the control is not limited to this example. For example, the movement control may be such that the display element is moved by the indicator so as to keep out of the indicator. FIG. 6 is a diagram depicting one example of a display screen where display elements E1 and E2 and an indicator shaped like a prosthetic hand of Captain Hook are displayed.

Figure 7:
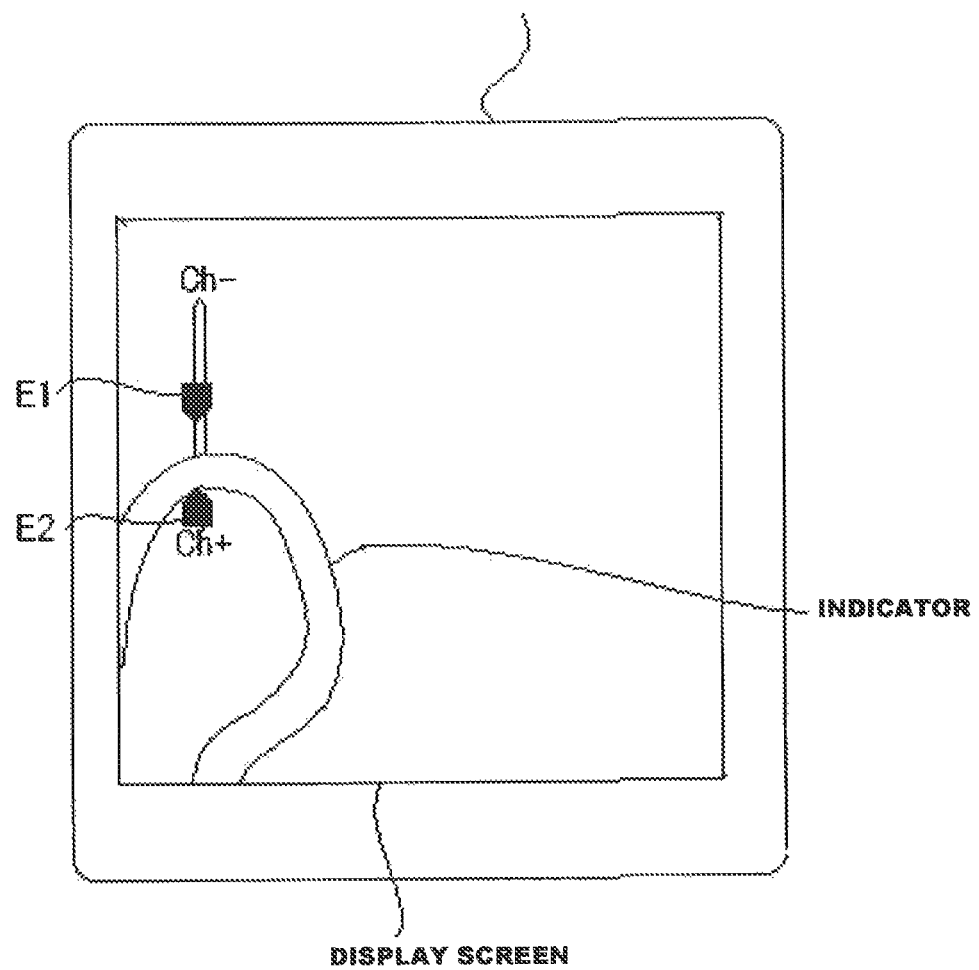
FIG. 7 is a view depicting a screen example transitioned from the display screen in FIG. 6.

As depicted in FIG. 6, the representation display control unit 102*c* may display the indicator on the display screen of the display device 112 such that the indicator moves in conjunction with a motion of the arm of the person detected with the image capture device 112. Then, the display position change unit 102*b* of the element display control unit 102*a* may move the display elements E1 and E2 such that the display elements E1 and E2 are each driven out by the outline of the indicator. In this example, the display position change unit 102*b* limits the direction, range or the like where each of the display elements or points can be moved. Specifically, the display position change unit 102*b* performs control to only allow the display element E1 to move within a predetermined upper range (a groove display portion) in FIG. 6, and to only allow the display element E2 to move within a predetermined lower range (a groove display portion) in FIG. 6. FIG. 7 is a diagram depicting an example of a screen transitioned from the display screen in FIG. 6.

As depicted in FIG. 7, the representation display control unit 102*c* may move the indicator in conjunction with a motion of the arm moved by the user, and in response to this, the display position change unit 102*b* may perform movement control such that the display element E5 is driven out by the outline of the indicator. In the example in FIG. 7, the selection judgment unit 102*d* may judge that the display element E2 is selected when the display element E2 is pulled down to the lower end of the predetermined lower range. In this example, when it is judged that the display element E2 is selected, the control unit 102 of the element selection apparatus 100 turns the channel of the television to the next channel in the plus direction and displays the next channel (that is, a broadcast program at the channel in the number incremented by one from the number of the originally set channel). For instance, if a channel 1 is displayed, then a channel 2 will be displayed.

Here, the description of the example of the processing of the element selection apparatus 100 in the present embodiment is completed.

Although the above example is described on the premise that the associated display elements are displayed in advance, this condition is not prerequisite. In another embodiment, the display elements are not displayed in advance but are displayed concurrently with display of a representation. For example, concurrently with display of a representation, a channel selection screen may be displayed on a television screen. Namely, after a display element for selecting any of channels is presented, a channel selection may be accepted when the display element is dragged to a certain point with the hand's representation.

According to the present embodiment, provided is an interface in which a display element is provided as a pointer such that the display element can be manipulated by a hand itself as described above, unlike a conventional technique where a hand is detected and is used as a pointing device (position point input unit) by way of hand tip-end detection and C/O detection (ITE Technical Report, VIS2001-103, Vol. 25, No. 85, pp. 47 to 52 (2001)). In the conventional technique, there is a technique in which finger tips of a hand are set as coordinate positions of a cursor and a click is associated with an event of bending the thumb. In such conventional technique, however, it may take time to calculate the coordinate positions, or the finger tips may be displaced when the thumb is bent. On the other hand, the present embodiment can solve such problems of the conventional technique. In the above-mentioned embodiment, one manipulation point is set, but two manipulation points may be set instead of one manipulation point. Use of two manipulation points allows the direction of a bar or the orientation of a three-dimensional object to be changed by the left and right hands, or enables a manipulation of scaring-down/up or the like in a multitouch manipulation.

Other Embodiments

The embodiments of the present invention have been described above. However, the present invention may be implemented by not only the embodiments described above but also various different embodiments within the technical idea described in the scope of claims.

For example, the above explanation is given of the case where the element selection apparatus 100 performs the processing in stand-alone mode as an example; however, the element selection apparatus 100 may perform the processing in response to a request from a client terminal (cabinet different from the element selection apparatus 100) and return the processing results to the client terminal.

Moreover, among the processings described in the embodiment, all or part of the processings described as automatic processing may be performed manually and all or part of the processings described as manual processing may be performed automatically by known methods.

In addition thereto, the processing procedures, the control procedures, the specific names, the information including registered data of each processing and parameters, such as retrieval conditions, the screen examples, and the database configurations, described in the literature and drawings above may be arbitrarily modified unless otherwise indicated.

Furthermore, each component of the element selection apparatus 100 illustrated in the drawings is formed on the basis of functional concept, and is not necessarily configured physically the same as those illustrated in the drawings.

For example, all or any part of the processing functions that the devices in the element selection apparatus 100 have, and particularly each processing function performed by the control unit 102, may be implemented by a CPU (Central Processing Unit) and a program interpreted and executed by the CPU, or may be implemented as hardware by wired logic. The program, which includes programmed instructions that let a computer to execute a method according to the present invention, is recorded in a non-transitory computer-readable storage medium and is mechanically read by the element selection apparatus 100 as necessary. Specifically, the storage unit 106, such as a ROM and an HDD (Hard Disk Drive), or the like records a computer program for providing instructions to the CPU in cooperation with the OS (Operating system) and for executing various processings. This computer program may be executed by being loaded into a RAM and configure the control unit in cooperation with the CPU.

Moreover, this computer program may be stored in an application program server that is connected to the apparatus 100 via the network 300, and all or part thereof may be downloaded as necessary.

Furthermore, the program according to the present invention may be stored in a computer-readable recording medium, or may be configured as a program product. The "recording medium" includes any "portable physical medium", such as a memory card, a USB memory, an SD card, a flexible disk, a magneto-optical disk, a ROM, an EPROM, an EEPROM, a CD-ROM, an MO, a DVD, and a Blue-Ray™ Disc.

Moreover, the "program" refers to a data processing method written in any language and any description method and is not limited to a specific format, such as source codes and binary codes. The "program" is not necessarily configured unitarily and includes a program constituted in a dispersed manner as a plurality of modules and libraries and a program that implements its functions in cooperation with a different program representative of which is an OS (Operating System). Well-known configurations and procedures may be used for the specific configuration and reading procedure for reading a recording medium, the installation procedure after reading a recording medium, and the like in each device illustrated in the present embodiment. The program product in which the program is stored in a computer-readable recording medium may be configured as one aspect of the present invention.

Various databases and the like (the element file 106*a*) stored in the storage unit 106 are a storage unit, example of which is a memory device, such as a RAM and a ROM, a fixed dish drive, such as a hard disk, a flexible disk, and an optical disk, and stores various programs, tables, databases, files for web pages, and the like that are used for various processings or providing websites.

Moreover, the element selection apparatus 100 may be configured as an information processing apparatus, such as known personal computer and workstation, or may be configured by connecting an arbitrary peripheral device to the information processing apparatus. Moreover, the element selection apparatus 100 may be realized by installing software (including program, data, and the like) that causes the information processing apparatus to realize the method according to the present invention.

A specific form of distribution/integration of the devices is not limited to those illustrated in the drawings and it may be configured such that all or part thereof is functionally or physically distributed or integrated, by arbitrary units, depending on various additions or the like or depending on functional load. In other words, the above-described embodiments may be implemented by arbitrarily combining them, with each other or the embodiments may be selectively implemented.

Hereinafter, other examples of claims according to the present invention are listed.

Claim 0

An element selection apparatus including at least a display unit, an image capture unit and a control unit, wherein the control unit includes an element display control unit that displays a selectable element or an element image associated with the element on a screen of the display unit, and a representation display control unit that displays, on the screen, a representation of a person whose image is captured with the image capture unit or an indicator that moves in conjunction with a motion of the person, and the element display control unit includes a movement control unit that causes the element or the element image to move so as to be driven out of the representation or the indicator displayed by the representation display control unit, and the control unit further includes a selection judgment unit that judges that the element is selected based on a movement degree or a post-movement position of the element or the element image moved by the movement control unit.

Claim 1

An element selection apparatus including at east a display unit, an image capture unit and a control unit, wherein the control unit includes:

a hand area display control unit that causes the image capture unit to capture an image of a user and displays a user area, which is at least a hand or finger area of the user, in a distinguishable manner on the display unit;

a display element movement unit that displays a selectable display element such that the selectable display element is moved so as to be driven out of the user area displayed by the hand area display control unit; and a selection judgment unit that judges that the display element is selected based on a movement degree of the display element moved by the display element movement unit.

Claim 2 (Display Element Movement Mode: Return to initial Position)

The element selection apparatus according to claim 1, wherein the display element movement unit controls movement of the display element as if a force of returning the display element to an initial position were applied to the display element.

Claim 3 (Display Element Movement Mode: Gravity)

The element selection apparatus according to claim 1 or 2, wherein the display element movement unit controls movement of the display element as if gravity in a downward direction of a screen were applied to the display element.

Claim 4 (Display Element Movement Mode: Magnet)

The element selection apparatus according to any one of claims 1 to 3, wherein the display element movement unit controls movement of the display element as if attractive forces were applied between the user area and the display element.

Claim 5 (Selection Judgment 1: Distance)

The element selection apparatus according to any one of claims 1 to 4, wherein the movement degree is a distance by which the display element is moved, the selection judgment unit judges that the display element is selected when the display element is moved by a predetermined threshold distance or longer.

Claim 6 (Selection Judgment 2: Time Period)

The element selection apparatus according to any one of claims 1 to 5, wherein the movement degree is a duration of movement of the display element, and the selection judgment unit judges that the display element is selected when a predetermined threshold time period or longer passes after the start of the movement of the display element.

Claim 7 (Exclusion: Representative Point of Display Element)

The element selection apparatus according to any one of claims 1 to 6, wherein the display element movement unit moves and displays the display element such that a representative point of the display element is driven out of the user area.

Claim 8 (Display Element Movement Mode: Tensile Force)

The element selection apparatus according to claim 2, wherein the display element movement unit controls movement of the display element as if a tensile force according to the movement degree were applied between an initial position and a post-movement position of a representative point of the display element, and when the representative point of the display element falls into a local minimum of an outline line of the user area, performs control to allow the display element to traverse the user area unless the representative point of the display element is located at a tangent point of the curve.

Claim 9

A program to be executed by an information processing apparatus including at least a display unit, an image capture unit and a control unit, the program causing the control unit to execute:

a hand area display controlling step of causing the image capture unit to capture an image of a user, and displaying at least a user area of the user in a distinguishable manner on the display unit;

a display element moving step of moving and displaying a selectable display element such that the selectable display element is driven out of the user area displayed in the hand area display controlling step; and a selection judging step of judging that the display element is selected based on a movement degree of the display element moved in the display element moving step.

Claim 10

An element selection method to be implemented by a computer including at least a display unit, an image capture unit and a control unit, the method comprising the following steps to be executed by the control unit:

an element display controlling step of displaying a selectable element or an element image associated with the element on a screen of the display unit;

a representation display controlling step of displaying, on the screen, a representation of a person whose image is captured with the image capture unit or an indicator that moves in conjunction with a motion of the person;

a movement controlling step of causing the element or the element image to move so as to be driven out of the representation or the indicator displayed in the representation display controlling step; and a selection judging step of judging that the element is selected based on a movement degree or a post-movement position of the element or the element image moved in the movement controlling step.

Claim 11

A program to be executed by a computer including at least a display unit, an image capture unit and a control unit, the program causing the control unit to execute:

an element display controlling step of displaying a selectable element or an element image associated with the element on a screen of the display unit;

a representation display controlling step of displaying, on the screen, a representation of a person whose image is captured with the image capture unit or an indicator that moves in conjunction with a motion of the person;

a movement controlling step of causing the element or the element image to move so as to be driven out of the representation or the indicator displayed in the representation display controlling step; and a selection judging step of judging that the element is selected based on a movement degree or a post-movement position of the element or the element image moved in the movement controlling step.

INDUSTRIAL APPLICABILITY

As has been described in details hereinabove, the present invention enables provision of an element selection apparatus, an element selection method and a program which are capable of improving ease of manipulation in selecting an element on a screen in a non-contact state, and provision of a storage medium.

EXPLANATION OF REFERENCE NUMERALS

100 element selection apparatus
102 control unit
102a element display control unit
102b display position change unit
102c representation display control unit
102d selection judgment unit 104 communication control interface unit
106 storage unit
106a element file
108 input-output control interface unit
112 image capture device
114 display device
200 external system
300 network

What is claimed is:

1. An element selection apparatus comprising:
a unit that recognizes a motion of a hand or finger;
a unit that displays a first image which moves in conjunction with the recognized motion of the hand or finger;
a unit that displays a second image associated with a selectable element, and performs movement control of the second image to cause the second image to avoid the moving first image; and
a unit that judges that the selectable element associated with the second image is selected when relation between the first image and the second image meets a predetermined condition.

2. An element selection apparatus comprising at least a display unit, a detection unit and a control unit, wherein the control unit includes:
a representation display control unit that displays, on a screen of the display unit, a representation of a person detected with the detection unit, or an indicator that moves in conjunction with a motion of the person;
an element display control unit that displays a selectable element or an element image associated with the selectable element on the screen of the display unit, and causes the selectable element or the element image to move to keep out of the representation or the indicator displayed by the representation display control unit; and
a selection judgment unit that judges that the selectable element is selected based on a movement degree or a post-movement position of the selectable element or the element image moved by the element display control unit, or based on the motion of the person.

3. The element selection apparatus according to claim 2, wherein
the element display control unit performs control to cause the selectable element or the element image to move so as to be driven out of the representation or the indicator, or to move the selectable element or the element image to a predetermined position or in a predetermined direction.

4. The element selection apparatus according to claim 2, wherein
the representation display control unit that displays, on the screen, a representation of an arm, a hand or a finger of the person whose image is captured with the detection unit or the indicator that moves in conjunction with the motion of the arm, the hand, or the finger of the person.

5. The element selection apparatus according to claim 2, wherein
the element display control unit causes the selectable element or the element image to move so as to be driven out by an outline or a center line of the representation or the indicator.

6. The element selection apparatus according to claim 2, wherein
the movement degree is a moving distance or a time period elapsed after movement from an initial position.

7. An element selection method comprising the steps of:
recognizing a motion of a hand or finger;
displaying a first image that moves in conjunction with the recognized motion of the hand or finger;
displaying a second image associated with a selectable element, and performing movement control of the second image to cause the second image to avoid the moving first image; and
judging that the selectable element associated with the second image is selected when relation between the first image and the second image meets a predetermined condition.

8. An element selection method to be implemented by a computer including at least a display unit, a detection unit and a control unit, wherein the method executed by the control unit comprises:
a representation display controlling step of displaying, on a screen of the display unit, a representation of a person detected with the detection unit or an indicator that moves in conjunction with a motion of the person;
an element display controlling step of displaying a selectable element or an element image associated with the selectable element on the screen of the display unit, and causing the selectable element or the element image to move to keep out of the representation or the indicator displayed in the representation display controlling step; and
a selection judging step of judging that the selectable element is selected based on a movement degree or a post-movement position of the element or the element image moved in the element display controlling step, or based on the motion of the person.

9. A non-transitory computer-readable recording medium in which a program is recorded, the program causing a computer to execute the steps of:
recognizing a motion of a hand or finger;
displaying a first image that moves in conjunction with the recognized motion of the hand or finger;
displaying a second image associated with a selectable element, and performing movement control of the second image to cause the second image to avoid the moving first image; and
judging that the selectable element associated with the second image is selected when relation between the first image and the second image meets a predetermined condition.

10. A non-transitory computer-readable recording medium in which a program is recorded and to be executed by a computer including at least a display unit, a detection unit and a control unit, the program causing the control unit to execute:
a representation display controlling step of displaying, on a screen of the display unit, a representation of a person detected with the detection unit or an indicator that moves in conjunction with a motion of the person;
an element display controlling step of displaying a selectable element or an element image associated with the selectable element on the screen of the display unit, and causing the element or the selectable element image to move to keep out of the representation or the indicator displayed in the representation display controlling step; and
a selection judging step of judging that the selectable element is selected based on a movement degree or a post-movement position of the selectable element or the element image moved in the element display controlling step, or based on the motion of the person.

* * * * *